United States Patent
Guerra et al.

(10) Patent No.: US 7,956,155 B2
(45) Date of Patent: Jun. 7, 2011

(54) NANOPOROUS CRYSTALLINE FORM OF SYNDIOTACTIC POLYSTYRENE, PROCESSES FOR ITS PREPARATION AND RELATED MOLECULAR-COMPLEX CRYSTALLINE FORMS

(75) Inventors: Gaetano Guerra, Salerno (IT); Christophe Daniel, Gaiano di Fisciano (IT); Anna De Girolamo Del Mauro, Pagani (IT); Paola Rizzo, Naples (IT)

(73) Assignee: Università degli Studi di Salerno, Fisciano SA (IT)

( * ) Notice: Subject to any disclaimer, the term of this patent is extended or adjusted under 35 U.S.C. 154(b) by 110 days.

(21) Appl. No.: 12/377,317

(22) PCT Filed: Aug. 21, 2007

(86) PCT No.: PCT/IB2007/053332
§ 371 (c)(1),
(2), (4) Date: May 14, 2009

(87) PCT Pub. No.: WO2008/023331
PCT Pub. Date: Feb. 28, 2008

(65) Prior Publication Data
US 2010/0210806 A1    Aug. 19, 2010

(30) Foreign Application Priority Data

Aug. 22, 2006 (IT) ............................. SA2006A0022

(51) Int. Cl.
*C08F 6/00* (2006.01)
*C08G 64/00* (2006.01)
(52) U.S. Cl. ..................... 528/490; 526/34.2; 526/34.7
(58) Field of Classification Search ................ 526/34.7, 526/34.2; 528/490
See application file for complete search history.

(56) References Cited

OTHER PUBLICATIONS

International Search Report for PCT/IB2007/053332, mailed Mar. 3, 2008.
Written Opinion of the International Searching Authority for PCT/IB2007/053332, mailed Mar. 3, 2008.
Rizzo, Paola et al., "New host polymeric framework and related polar guest cocrystals", Chemistry of Materials, vol. 19, No. 16, (Jul. 12, 2007), pp. 3864-3866.
Rizzo, Paola et al., "Thermal transitions of epsilon crystalline phases of syndiotactic polystyrene", Macromolecules, vol. 40, No. 26, (Nov. 22, 2007), pp. 9470-9474.
Rizzo, Paola et al., "Crystalline Orientation in Syndiotactic Cast Films", Macromolecules, vol. 35, No. 15, (Jun. 12, 2002), pp. 5854-5860.

*Primary Examiner* — Terressa M Boykin
(74) *Attorney, Agent, or Firm* — Nixon & Vanderhye P.C.

(57) ABSTRACT

The present invention relates to a process for preparing a new nanoporous crystalline form of syndiotactic polystyrene, to the thus obtained crystalline form, to molecular-complex crystalline phases obtained by exposition of such crystalline form to low-molecular-mass molecules, and to the related processes for their preparation.

14 Claims, 2 Drawing Sheets

NANOPOROUS CRYSTALLINE FORM OF SYNDIOTACTIC POLYSTYRENE, PROCESSES FOR ITS PREPARATION AND RELATED MOLECULAR-COMPLEX CRYSTALLINE FORMS

This application is the U.S. national phase of International Application No. PCT/IB2007/053332, filed 21 Aug. 2007, which designated the U.S. and claims priority to Italy Application No. SA2006000022, filed 22 Aug. 2006, the entire contents of each of which are hereby incorporated by reference.

The present invention relates to a process for preparing a new nanoporous crystalline form of syndiotactic polystyrene, to the thus obtained crystalline form, to the molecular-complex crystalline forms obtained by exposition of such form to low-molecular-mass molecules, and to the related processes for their preparation.

STATE OF THE ART

The present invention is located in the technical-scientific fields of industrial chemistry and engineering. More specifically, in the area of molecular analysis and separation for the nanoporous form and in the area of functionalized polymer material, mainly with particular optical and electrical properties, for the molecular-complex forms.

It is well-known that syndiotactic polystyrene (s-PS) is a thermoplastic semi, crystalline polymeric material which presents an extremely complex polymorphism. In particular, two crystalline forms ($\alpha$ and $\beta$) characterized by a trans-planar zig-zag chain conformation can be obtained by melt manufacture processes, while two other crystalline forms ($\gamma$ and $\delta$ which are obtained from solution manufacture processes) are characterized by a s(2/1)2 helical chain conformation.

Furthermore, it is also well-known that the $\delta$ form is a nanoporous crystalline form, which can be obtained by removal of low molecular weight guest molecules from molecular-complex crystalline forms (clathrate or intercalate). Such $\delta$-form is characterized by a X-ray diffraction pattern presenting higher intensity reflections at $2\theta$ (CuK$\alpha$) $\approx 8.4°$, $10.6°$, $13.4°$, $16.8°$, $20.7°$, $23.5°$. Samples with the $\delta$-form can absorb from liquid or gaseous mixtures in the crystalline phase (i.e. to form molecular-complex phases), volatile organic compounds, also when those compounds are present at low concentrations and thus such samples can be used for molecular separation and sensorics.

Materials based on s-PS presenting molecular-complex crystalline phases with various guest molecules have been proposed as advanced materials (see in particular: 1) Stegmaier, P.; De Girolamo Del Mauro, A.; Venditto, V.; Guerra, G. Optical recording materials based on photoisomerization of guest molecules of a polymeric crystalline host phase. *Adv. Mater.* 17, 1166-1168, 2005. 2) Uda, Y.; Kaneko, F.; Tanigaki, N.; Kawaguchi, T. The first example of a polymer-crystal-organic-dye composite material: The clathrate phase of syndiotactic polystyrene with azulene *Adv. Mater.* 17, 1846-1850, 2005.).

Several structural studies by means of X-ray diffraction and infrared linear dichroism have clearly shown that planar or quasi-planar guest molecules of molecular-complex crystalline phases obtained from the $\delta$-form, are generally oriented with their molecular plane nearly perpendicular to the polymer host chain-axes. This can be shown for example (as described in details in the article: "A Clear-Cut Experimental Method to Discriminate between In-Plane and Out-of-Plane Molecular Transition Moments" from A. R Albunia, G. Milano, V. Venditto, G. Guerra, *J. Am. Chem. Soc.* 2005, 127, 13114-13115) with the positive or negative sign of the relative linear dicroism value $LD^r = 3(A_{\parallel} - A_{\perp})/(A_{\parallel} + A_{\perp})$, $A_{\parallel}$ and $A_{\perp}$ being the measured absorbance intensities for electric vectors (polarized light) parallel and perpendicular to the stretching direction, respectively. In particular, guest molecule infra-red absorbance peaks corresponding to vibrational modes being out of the molecular plane (out-of plane) or in the molecular plane (in-plane) show positive and negative $LD^r$ values, respectively.

Through a new preparation process it has now been found a new nanoporous crystalline form of syndiotactic polystyrene, thereafter named $\epsilon$, which can give rise to a new molecular-complex crystalline phases after its exposition to low-molecular-mass compounds.

In particular the nanoporous $\epsilon$ form, after sorption of polar guest molecules can lead to molecular-complex phases with planar or quasi-planar guests being nearly parallel to the polymer chain-axes. Actually, for such molecular complexes when present in monoaxially stretched samples, the infra-red absorbance peaks of the guest molecules corresponding to out-of plane and in-plane vibrational modes present negative and positive $LD^r$ values, respectively.

It is therefore an object of the present invention a process for preparing polymeric materials based on s-PS containing the $\epsilon$ crystalline form, comprising the following steps:
  a) preparation of polymeric materials based on s-PS containing the $\gamma$ crystalline form;
  b) treatment of said materials with chloroform vapours until the obtaining of a molecular complex phase with chloroform and
  c) extraction of chloroform and obtaining of polymeric materials based on s-PS containing the $\epsilon$ crystalline phase, wherein s-PS is a styrene homopolymer or styrene copolymers with $CH_2$=CH—R olefins, wherein R is an alkyl-aryl or a substituted-aryl radical with 6-20 carbon atoms, or with other copolymerizable ethylenically unsaturated monomers, such copolymers being characterized by a microstructure prevailingly syndiotactic and by a molar content of styrene larger than 40%.

It is well-known from literature that the $\gamma$ crystalline form is characterized by a x-ray diffraction pattern presenting higher intensity reflections at $2\theta$ (CuK$\alpha$)$\approx 9.2°$, $10.5°$, $14.0°$, $16.2°$, $19.9°$, $28.5°$. Materials containing the $\gamma$ crystalline form can be obtained by annealing at temperature in the range 110-170° C. of materials obtained from solution processes. A detailed description of the various processes allowing to obtain the s-PS $\gamma$ form is reported in the article: "Polymorphism of syndiotactic polystyrene: $\gamma$ phase crystallization induced by bulky non-guest solvents" by P. Rizzo. A. R. Albunia, G. Guerra *Polymer* 2005, 46, 9549.

The treatments of materials in $\gamma$ form in said step b) of the process of the present invention can be carried out with liquid or vapour phase chloroform. The operative conditions for the treatment are known from the state of the art; however temperatures between room temperature and 70° C. are preferred. The complete obtaining of a molecular complex with chloroform can be determined, for example, from x-ray diffraction pattern on the basis of the vanishing of the reflection at $2\theta$ (CuK$\alpha$)$\approx 9.2°$.

The extraction processes of chloroform in said step c) can be carried out by liquid or supercritical carbon dioxide, operating at pressures between 50 and 350 bar and temperature between 20 and 70° C. Extraction processes with other solvents being volatile "guests" of the s-PS nanoporous phases such as, for example, acetone or acetonitrile are also efficient.

BRIEF DESCRIPTION OF THE DRAWINGS

The present description contains three drawings showing.

DETAILED DESCRIPTION

Under syndiotactic polystyrene (s-PS), a polymer with syndiotactic sequences of the polymer chain long enough to allow the polymer crystallization is meant. Such polymer can be for example synthesized following the method described in the European patent N° 0271875-Himont Italia. In the definition of syndiotactic polystyrene, in the present invention, in addition to syndiotactic polystyrene homopolymers, are also included styrene copolymers with $CH_2=CH-R$ olefins, wherein R is an alkyl-aryl or a substituted aryl radical with 6-20 carbon atoms, or with other copolymerizable ethylenically unsaturated comonomers, such copolymers being characterized by a prevailingly syndiotactic microstructure and by a molar content of styrene larger than 40%.

Through the procedure of the present invention, a new nanoporous crystalline form of s-PS, thereafter named ε which is also object of the present invention, is obtainable, this form being characterized by a X-ray diffraction pattern presenting high intensity reflections at 2θ (CuKα)≈6.9°, 8.2°, 13.8°, 16.4°, 20.5°, 23° is obtainable. Moreover, polymeric materials containing said ε form in a fraction between 5 and 70 wt % are also obtainable.

Figure 1:
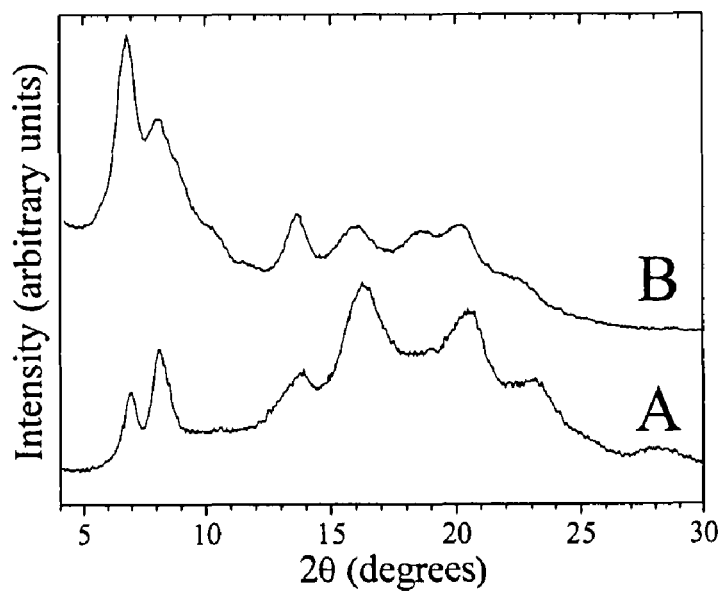
FIG. 1. the x-ray diffraction patterns of s-PS samples presenting the new ε crystalline form: (A) non-oriented sample, (B) monoaxially stretched film (equatorial profile)

The X-ray diffraction pattern of a non-oriented semi-crystalline sample in ε form is reported in FIG. 1A. The equatorial profile of the X-ray diffraction pattern of monoaxially oriented semi-crystalline sample in ε form, is reported in FIG. 1B.

After sorption of polar guest, the nanoporous form ε, is able to form molecular-complex phases with planar or quasi-planar guest nearly parallel with respect to the polymer chain axes. As a matter of fact for such molecular complexes, when present in monoaxially oriented samples, the infra-red absorbance peaks of the guest molecules, corresponding to out-of plane and in-plane vibrational modes, present negative and positive $LD^r$ values, respectively.

Further object of the present invention is a process for preparing molecular-complex crystalline phases from the nanoporous ε crystalline form with polar guest molecules having molecular planes nearly parallel with respect to the polymer chain axes, comprising the following steps:

a) treatment of polymeric material being in the ε crystalline form with solutions of polar molecules with concentration higher than 2 wt %, using as solvent volatile guests of syndiotactic polystyrene;

b) solvent extraction from said polymeric material and obtaining of a molecular-complex crystalline phase.

The polymeric material being in the ε crystalline form is preferably treated with solutions of polar molecules with concentrations higher than 10%. The exact concentration of the solution containing the polar molecules will be chosen on the basis of the molecular solubility. Among polar molecules, p-nitro-aniline and 4-(dimethyl-amino)cinnamaldehyde are particularly preferred. Acetone and acetonitrile are preferred as solvents. The treatment temperature of said step a) is usually room temperature but temperatures below 130° C. can also be used.

Extraction in said step b) is preferably carried out through thermal treatments at temperature below 70° C. or through liquid or supercritical carbon dioxide, operating at pressures between 50 and 350 bar and temperature between 20 and 70° C.

Further object of the present invention are the molecular-complex crystalline forms s-PS/guest obtainable with the process previously claimed, by exposition of ε crystalline phases to low-molecular-mass guest molecules. Such crystalline forms with molecular-complexes are characterized by the presence of a X-ray diffraction peak in the range 2θ (CuKα) 6.6°-7.2° and of a second diffraction peak in the range 2θ (CuKα) 7.8°-8.2°, and by an intensity ratio (determined as the ratio between the peak intensities in the pattern of non-oriented samples) between 0.2 and 3. Such crystalline forms are normally present in semi-crystalline materials with crystallinity degrees between 5-70%.

Particularly relevant for their optical and electrical properties, are the molecular-complex crystalline phases s-PS/guest obtained in samples in crystalline ε form by sorption of guest molecules with dipole moment higher than 2 Debye. Suitable polar guests are for example, p-nitroaniline, 4-methoxy-β-nitrostyrene, p-(dimethyl-amino)cinnamaldehyde, and trans-β-nitrostyrene. In these cases, infra-red linear dichroism measurements show that the guest molecular planes are oriented nearly parallel to the polymer chain axes of the crystalline phase. As a matter of fact, for these molecular complexes, when present in monoaxially stretched samples, the infra-red absorbance peaks corresponding to out-of plane and in-plane vibrational modes present negative and positive $LD^r$ values, respectively.

The following examples are supplied in order to illustrate the invention without limiting the scope thereof.

Example 1

The syndiotatic polystyrene homopolymer was supplied as pellets by "DOW Chemical" under the trademark Questra 101. The polymer dissolved in chloroform (1 wt % solution) at 110° C., is precipitated in methanol. The powder obtained is desiccated at 60° for 2 h. Then, after annealing at 160° C. for 12 h, the powder presents the γ-form.

The γ-form powder is treated with liquid chloroform at room temperature for 20 h. The material is treated with a chloroform extraction procedure by supercritical carbon dioxide (T=45° C., p=200 bar, extraction time t=30 min). After extraction, a polymeric material with a chloroform content below 0.1 wt % is obtained.

The materials obtained present the new nanoporous ε crystalline phase, as shown on the x-ray diffraction pattern (CuKα) reported in FIG. 1A. The x-ray diffraction pattern obtained shows higher intensity reflections at 2θ (CuKα) ≈6.9°, 8.2°, 13.8°, 16.4°, 20.5°, 23°. The crystallinity degree, evaluated from the ratio of the diffraction area due to the crystalline phase and the total diffraction area, is equal to c.a. 40%.

Example 2

The syndiotatic polystyrene homopolymer was supplied as pellets by "DOW Chemical" under the trademark Questra 101. Monoaxially oriented films with a thickness of c.a. 30 μm are obtained from extruded films stretched monoaxially, at draw ratio λ≈3 at constant deformation rate of 0.1 s$^{-1}$ in the temperature range 105-110° C. Such oriented films were crystallized into δ-form by exposure to $CS_2$ vapors followed by desorption. Monoaxially oriented γ-form films have been obtained from monoaxially stretched δ form films by annealing at 160° C. for 12 hours.

The oriented film being in the γ form is treated with liquid chloroform at room temperature for 4 h. Then, the film is treated with a extraction procedure by liquid acetonitrile for 10 min. After extraction, a polymeric material with a chloroform content below 0.1 wt % is obtained.

The film obtained presents the new nanoporous crystalline form ε as shown from the X-ray diffraction patterns. In particular, the equatorial profile is reported in FIG. 1B. The diffraction pattern shows high intensity reflections at 2θ (CuKα)≈6.9°, 8.2°, 13.9°, 16.3°, 20.5°, 23°.

Example 3

A monoaxially stretched s-PS film being in ε form obtained according to the procedure of Example 2 is used.

The film being in ε form is treated at room temperature for 90 min with an acetone solution saturated with p-nitroaniline which is a compound with a dipole moment equal to 6.2 Debye.

The film treated with p-nitroaniline is characterized by an equatorial profile of the X-ray diffraction pattern (FIG. 2A) showing higher intensity reflections at 2θ (CuKα)≈6.9°, 8.1°, 10°, 13.7°, 16°, 20°.

Figure 2:
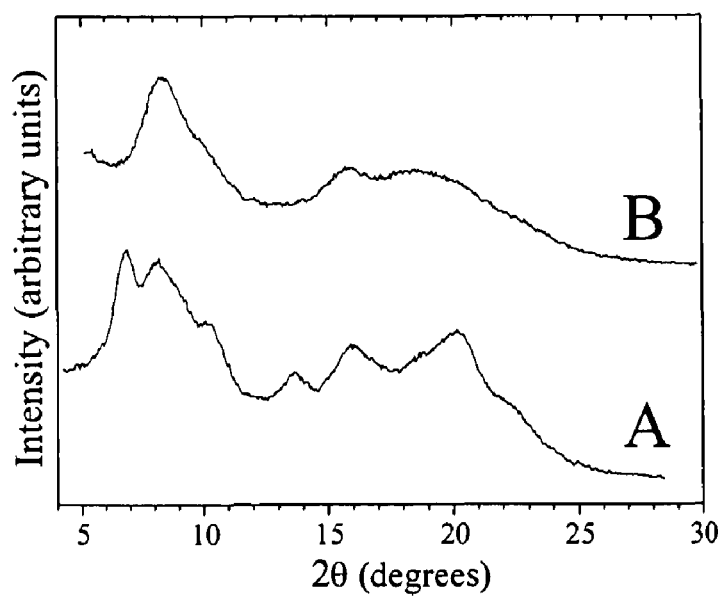
FIG. 2. the equatorial profiles of x-ray diffraction patterns of monoaxially stretched s-PS films containing molecular-complex crystalline phases with p-nitro-aniline obtained by sorption of such polar guest in films being: (A) in ε form, (B) in δ form.

For comparison, the equatorial profile of the X-ray diffraction pattern (CuKa) of a s-PS film being in δ form treated with an acetone solution saturated with p-nitroaniline is also shown in FIG. 2B. Such diffraction pattern does not display any reflection for 2θ (CuKα) smaller than 8°.

Infrared linear dichroism spectra for the films of FIGS. 2A and 2B reported in FIGS. 3A and 3B, respectively, show that the infrared absorbance peaks of p-nitroaniline are dichroic both for the sample obtained from the ε form and for the sample obtained from the δ form. This indicates the formation, in both cases, of molecular complex crystalline phases with s-PS and the polar guest.

Figure 3:
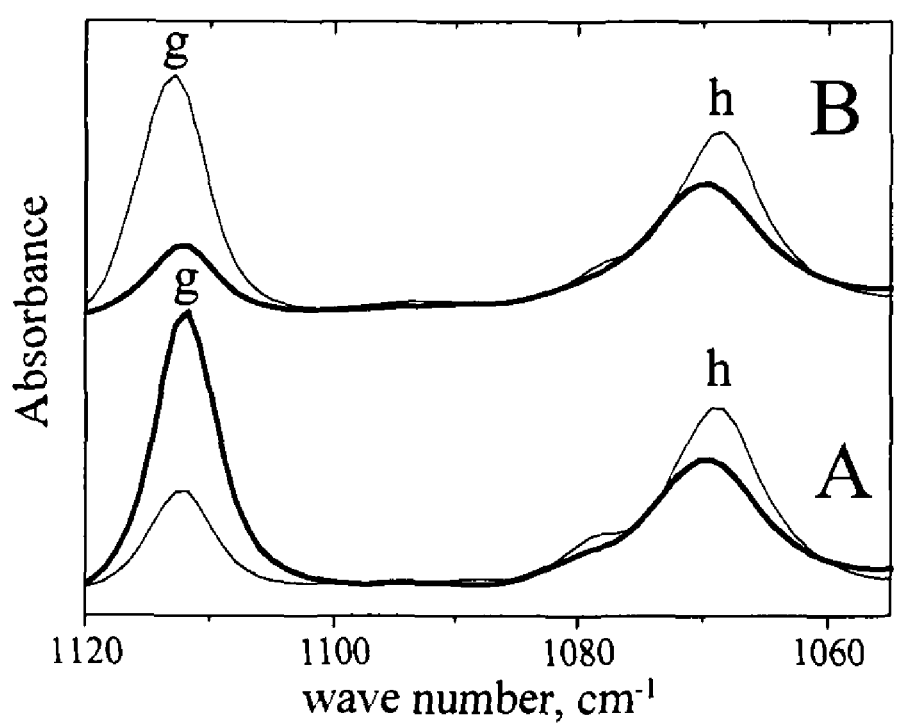
FIG. 3 the FTIR spectra collected with polarization light perpendicular (thin lines) and parallel (thick lines) to the film stretching direction of monoaxially stretched films containing molecular-complex crystalline phases s-PS/p-nitroaniline obtained by sorption of this polar guest in films being: (A) in ε form, (B) in δ form.

Moreover, the measurements of the infrared linear dichroism of FIG. 3 show that the two molecular-complex crystalline phases are totally different. Indeed, while the dichroism of the absorbance peaks of the polymer host is almost identical (see for example the peak at 1069 cm$^{-1}$ in FIG. 3), the dichroism of the absorbance peaks of the guest is of opposite sign (see for example the peak at 1112 cm$^{-1}$ in FIG. 3).

In particular, the relative linear dichroism values $LD^r$ evaluated for the peak at 1112 cm$^{-1}$, corresponding to an "in-plane" vibrational mode, is equal to +1.1 and −0.89 for samples of FIGS. 3A and 3B, respectively. This clearly indicates that the molecular plane of the p-nitroaniline is nearly parallel to the chain axes of the crystalline phase for the molecular-complex obtained from the ε form, while it is nearly perpendicular to this direction in the case of the molecular-complex obtained from the δ form.

The invention claimed is:

1. Process for preparing polymeric materials based on syndiotactic polystyrene containing the epsilon crystalline phase, comprising the following steps:
    a) preparation of polymeric materials based syndiotactic polystyrene containing the gamma crystalline form;
    b) treatment of said materials with chloroform until a molecular complex phase with chloroform is obtained and
    c) extraction of chloroform and obtaining of polymeric materials based on syndiotactic polystyrene containing the epsilon crystalline form wherein syndiotactic polystyrene represents a styrene homopolymer or styrene copolymers with $CH_2$=CH—R olefins, wherein R is an alkyl-aryl or a substituted-aryl radical with 6-20 carbon atoms, or with other copolymerizable ethylenically unsaturated monomers, such copolymers being characterized by a microstructure prevailingly syndiotactic and by a molar content of styrene larger than 40%.

2. The process according to claim 1, wherein in said step b) the said treatment with chloroform can be achieved with liquid chloroform or with chloroform vapors.

3. The process according to claim 1, wherein in said step c) the said chloroform extraction is carried out by liquid or supercritical carbon dioxide operating at pressures between 50 and 350 bar and temperature between 20 and 70° C.

4. The process according to claim 1, wherein in said step c) said chloroform extraction is carried out by solvents being volatile guest of syndiotactic polystyrene nanoporous phases.

5. The process according to claim 4 wherein said solvents are selected from acetone or acetonitrile.

6. Polymeric materials based on syndiotactic polystyrene containing the epsilon crystalline form obtainable from the process as claimed in claim 1.

7. Epsilon crystalline form of syndiotactic polystyrene characterized by a X-ray diffraction pattern showing high intensity reflections at 2θ (CuKα)≈6.9°, 8.2°, 13.8°, 16.4°, 20.5°, 23°.

8. Process for the preparation of molecular-complex crystalline phases starting from the syndiotactic polystyrene nanoporous crystalline form epsilon with polar guest molecules with molecular planes nearly parallel to the polymeric chain axis, comprising the following steps:
    a) treatment of a polymeric material containing the epsilon crystalline form with solutions of polar molecules with concentration higher than 2 wt % using volatile guests of syndiotactic polystyrene as solvent;
    b) solvent extraction from said polymeric material and obtaining of a molecular-complex crystalline phase.

9. The process according to claim 8, wherein said polar guest molecules have a dipole moment larger than 2 Debye.

10. The process according to claim 9, wherein said molecules are selected from the class formed by p-nitroaniline, 4-methoxy-β-nitrostyrene, p-(dimethyl-amino)cinnamaldehyde, and trans-β-nitrostyrene.

11. The process according to at least claim 8, wherein in said step a) the solvents are acetone and acetonitrile and the treatment temperature is between room temperature and 130° C.

12. The process according to claim 1 wherein in said step b) said extraction is carried out by thermal treatments at temperatures below 70° C. or by liquid or supercritical carbon dioxide at pressures between 50 and 350 bar and temperature between 20 and 70° C.

13. Syndiotactic polystyrene/guest molecular-complex crystalline form, obtainable according to the process claimed in claim 8.

14. Crystalline form according to claim 13 characterized by the presence of a first diffraction peak in the range 2θ (CuKα) 6.6°-7.2° and of a second diffraction peak in the range 2θ (CuKα) 7.8°-8.2°, and by an intensity ratio (determined as the ratio between the peak intensities in patterns of non-oriented samples) between 0.2 and 3.

* * * * *